(12) United States Patent
Hu et al.

(10) Patent No.: US 11,826,776 B2
(45) Date of Patent: Nov. 28, 2023

(54) LINER SYSTEMS AND METHODS FOR HIGH-PRESSURE FLUID VESSELS

(71) Applicant: GOODRICH CORPORATION, Charlotte, NC (US)

(72) Inventors: Jin Hu, Hudson, OH (US); Nathaniel Ching, Hartville, OH (US); Phi Doan, Uniontown, OH (US); Casey Slane, Tallmadge, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 471 days.

(21) Appl. No.: 16/934,700

(22) Filed: Jul. 21, 2020

(65) Prior Publication Data

US 2022/0023913 A1    Jan. 27, 2022

(51) Int. Cl.
*B05D 1/18* (2006.01)
*B05D 7/22* (2006.01)
*F17C 1/10* (2006.01)

(52) U.S. Cl.
CPC .............. *B05D 1/18* (2013.01); *B05D 7/227* (2013.01); *F17C 1/10* (2013.01); *B05D 2259/00* (2013.01); *F17C 2203/0604* (2013.01); *F17C 2203/0607* (2013.01); *F17C 2203/0648* (2013.01)

(58) Field of Classification Search
None
See application file for complete search history.

(56) References Cited

U.S. PATENT DOCUMENTS

| | | | |
|---|---|---|---|
| 3,896,602 A | 7/1975 | Petterson | |
| 4,584,041 A | 4/1986 | Lyman et al. | |
| 10,287,052 B2 | 5/2019 | Vanswijgenhoven et al. | |
| 10,590,634 B2 | 3/2020 | Giamati | |
| 2007/0246475 A1 | 10/2007 | Mazabraud et al. | |
| 2013/0167480 A1* | 7/2013 | Illsley | C08J 7/0427 426/106 |
| 2017/0307139 A1* | 10/2017 | Sinha | F17C 1/10 |
| 2019/0061947 A1 | 2/2019 | Slane et al. | |
| 2019/0061986 A1 | 2/2019 | Slane et al. | |
| 2019/0209435 A1* | 7/2019 | Brandenburger | A61J 1/2048 |
| 2019/0291386 A1* | 9/2019 | Lemme | B32B 27/20 |
| 2021/0131604 A1* | 5/2021 | Hajri | G06T 7/001 |

FOREIGN PATENT DOCUMENTS

| | | |
|---|---|---|
| DE | 3342386 | 9/1988 |
| DE | 19500319 | 7/1996 |
| EP | 3381985 | 10/2018 |
| JP | 2005315367 | 11/2005 |

OTHER PUBLICATIONS

European Patent Office, European Search Report dated Dec. 20, 2021 in Application No. 21186944.1.

* cited by examiner

*Primary Examiner* — Shamim Ahmed
*Assistant Examiner* — Bradford M Gates
(74) *Attorney, Agent, or Firm* — SNELL & WILMER L.L.P.

(57) ABSTRACT

A method of coating a high-pressure fluid vessel comprises filling a high-pressure fluid vessel with a coating solution, draining the coating solution, and drying a remainder of the coating solution in the high-pressure fluid vessel. The coating solution may include a thermoplastic elastomer that is hard with a low glass transition temperature and a high melting temperature. Drying the remainder of the coating solution may form a food grade coating within the high-pressure fluid vessel.

14 Claims, 8 Drawing Sheets

LINER SYSTEMS AND METHODS FOR HIGH-PRESSURE FLUID VESSELS

FIELD

The present disclosure relates to high-pressure fluid vessels. More specifically, the present disclosure relates to liner systems and methods for high-pressure fluid vessels for use in aircraft potable water systems.

BACKGROUND

Conformal aircraft potable water systems supply drinkable water throughout an aircraft for various uses. Aircraft potable water systems typically include many parts, including but not limited to fluid vessels, hydraulic pumps, fluid heaters, control valves, and hydraulic fluid line tubing. The fluid vessels may utilize an interior liner as a barrier to prevent leaking of trace potable water non-compliable materials from the fluid vessel and prevent water from directly contacting composite walls of the fluid vessel. For multiple compartment fluid vessels with small internal passages, coating the internal cavities may be difficult.

SUMMARY

A method of coating a plurality of high-pressure fluid vessels is disclosed herein. The method comprises: filling a first high-pressure fluid vessel with a coating solution; draining the coating solution from the first high-pressure fluid vessel; drying the first high-pressure fluid vessel; filling a second high-pressure fluid vessel with the coating solution; draining the coating solution from the second high-pressure fluid vessel; and drying the second high-pressure fluid vessel.

In various embodiments, the coating solution includes a thermoplastic elastomer comprising a hardness between 75 shore A and 95, a melting temperature between 120° C. (248° F.) and 220° C. (428° F.), and a glass transition temperature between 120° C. (248° F.) and 220° C. (428° F.). In various embodiments, a film of the coating solution remains on an interior surface of the first high-pressure fluid vessel in response to draining the coating solution. Drying the first high-pressure fluid vessel may include flowing air through an inlet port of the first high-pressure fluid vessel and out and outlet port of the first high-pressure fluid vessel. The method may further comprise dissolving a thermoplastic elastomer into a solvent to form the coating solution. The method may further comprise adding an additive including a pigment additive to the coating solution, wherein the pigment additive is configured to contrast a first color of the coating solution with a second color of the first high-pressure fluid vessel. The method may further comprise adjusting a concentration of the coating solution to achieve a desired coating thickness.

A method of coating a high-pressure fluid vessel is disclosed herein. The method may comprise: dissolving a thermoplastic elastomer into a solvent to form a coating solution; filling the high-pressure fluid vessel with the coating solution; draining the coating solution from the high-pressure fluid vessel; and drying the coating solution remaining in the high-pressure fluid vessel to form a food grade coating on an interior surface of the high-pressure fluid vessel.

In various embodiments, the thermoplastic elastomer may comprise a hardness between 75 shore A and 95, a melting temperature between 120° C. (248° F.) and 220° C. (428° F.), and a glass transition temperature between 120° C. (248° F.) and 220° C. (428° F.). The method may further comprise adjusting a concentration of at least one of the thermoplastic elastomer and the solvent to the coating solution to reach a desired thickness of the food grade coating. The method may further comprise inspecting a coverage of the coating of the interior surface by contrasting a first color of the coating solution to a second color of the high-pressure fluid vessel. The method may further comprise adding a pigment additive to the coating solution. The pigment additive may include titanium oxide. The method may further comprise adding a rheology modifier to the coating solution to prevent dripping of the food grade coating during drying. The high-pressure fluid vessel may be configured for a potable water system.

A method of manufacturing a high-pressure fluid vessel is disclosed herein. The method may comprise: dissolving a thermoplastic elastomer into a solvent to form a coating solution; adding a pigment additive to the coating solution, the pigment additive configured to alter a color of the coating solution to a first color; coating an interior surface of the high-pressure fluid vessel; and inspecting a coverage of the coating of the interior surface by contrasting the first color of the coating solution to a second color of the high-pressure fluid vessel.

In various embodiments, the pigment additive may comprise titanium oxide. Coating the interior surface of the high-pressure fluid vessel may include filling the high-pressure fluid vessel with the coating solution. Coating the interior surface of the high-pressure fluid vessel may further comprise draining the coating solution from the high-pressure fluid vessel. Coating the interior surface of the high-pressure fluid vessel may further comprises drying the coating solution remaining in the high-pressure fluid vessel to form a food grade coating on the interior surface of the high-pressure fluid vessel.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
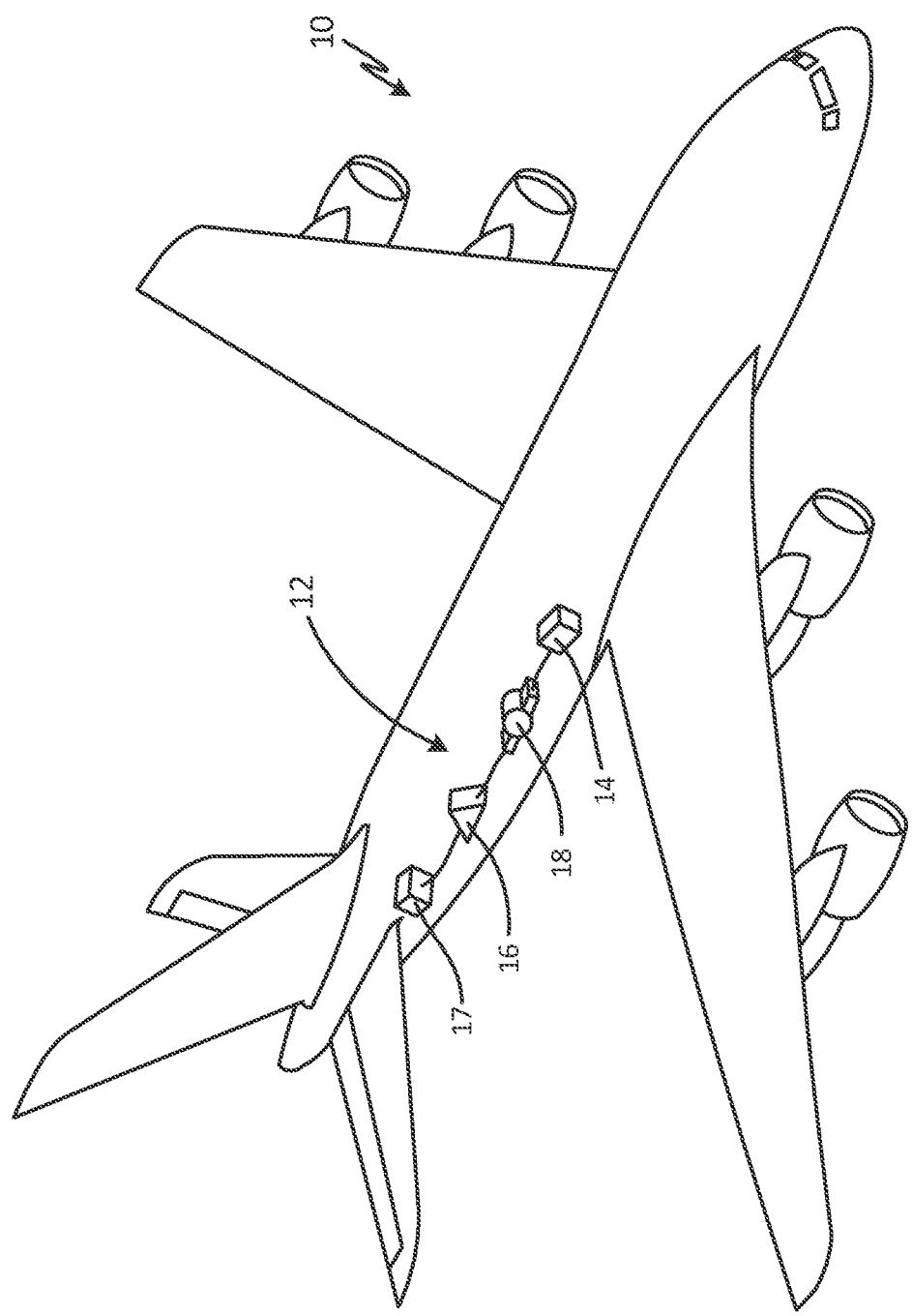
FIG. 1A illustrates a schematic of an aircraft with a potable water system, in accordance with various embodiments.
Figure 1B:
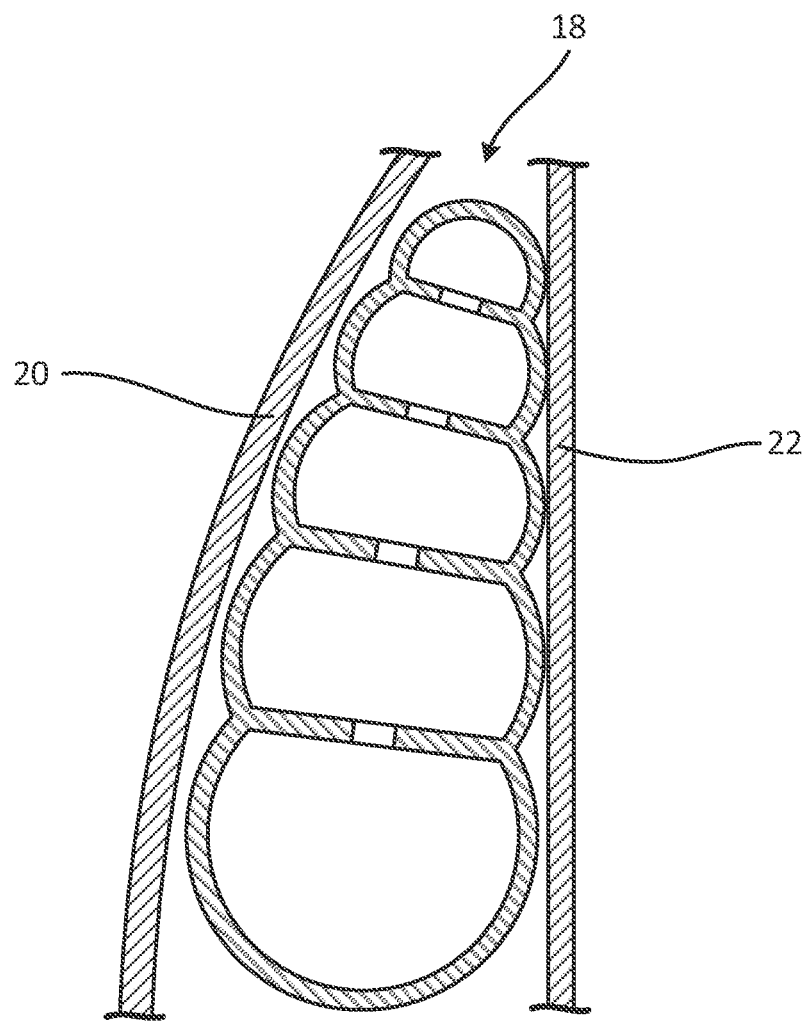
FIG. 1B illustrates a cross-sectional view of an aircraft fuselage, in accordance with various embodiments.

FIG. 1A is a schematic of aircraft 10 with potable water system 12, in accordance with various embodiments. The potable water system 12 may include an air compressor 14, a control valve 16, a point of use 17, and a high-pressure fluid vessel 18. FIG. 1B is a cross-sectional view of aircraft 10, in accordance with various embodiments, showing high-pressure fluid vessel 18, external fuselage structure 20, and internal aircraft structure 22.

In various embodiments, potable water system 12 is situated in an aft portion of aircraft 10. Within potable water system 12, tubes, lines, or hoses connect air compressor 14, control valve 16, point of use 17, and high-pressure fluid vessel 18. Fluid flow within potable water system 12 is induced by air compressor 14, which pressurizes the vessel and drives water through the potable water system. Control of the fluid flow within potable water system 12 is achieved by utilizing control valve 16. Potable water, for use in potable water system 12, is stored at an elevated pressure (e.g., around 50 psig between the inside and outside of the vessel) within high-pressure fluid vessel 18.

As shown in FIG. 1B, high-pressure fluid vessel 18 is configured to conform to both external fuselage structure 20 and internal aircraft structure 22. The portion of high-pressure fluid vessel 18 closest to external fuselage structure 20 is curved to conform to the curvature of external fuselage structure 20. Likewise, the portion of high-pressure fluid vessel 18 closest to internal aircraft structure 22 is more or less flat to conform to internal aircraft structure 22. FIG. 1B shows one embodiment of conformable high-pressure fluid vessel 18 and is not meant to limit the disclosure to a single embodiment. High-pressure fluid vessel 18 is conformable for use in a plurality of irregular aircraft spaces.

Figure 2A:
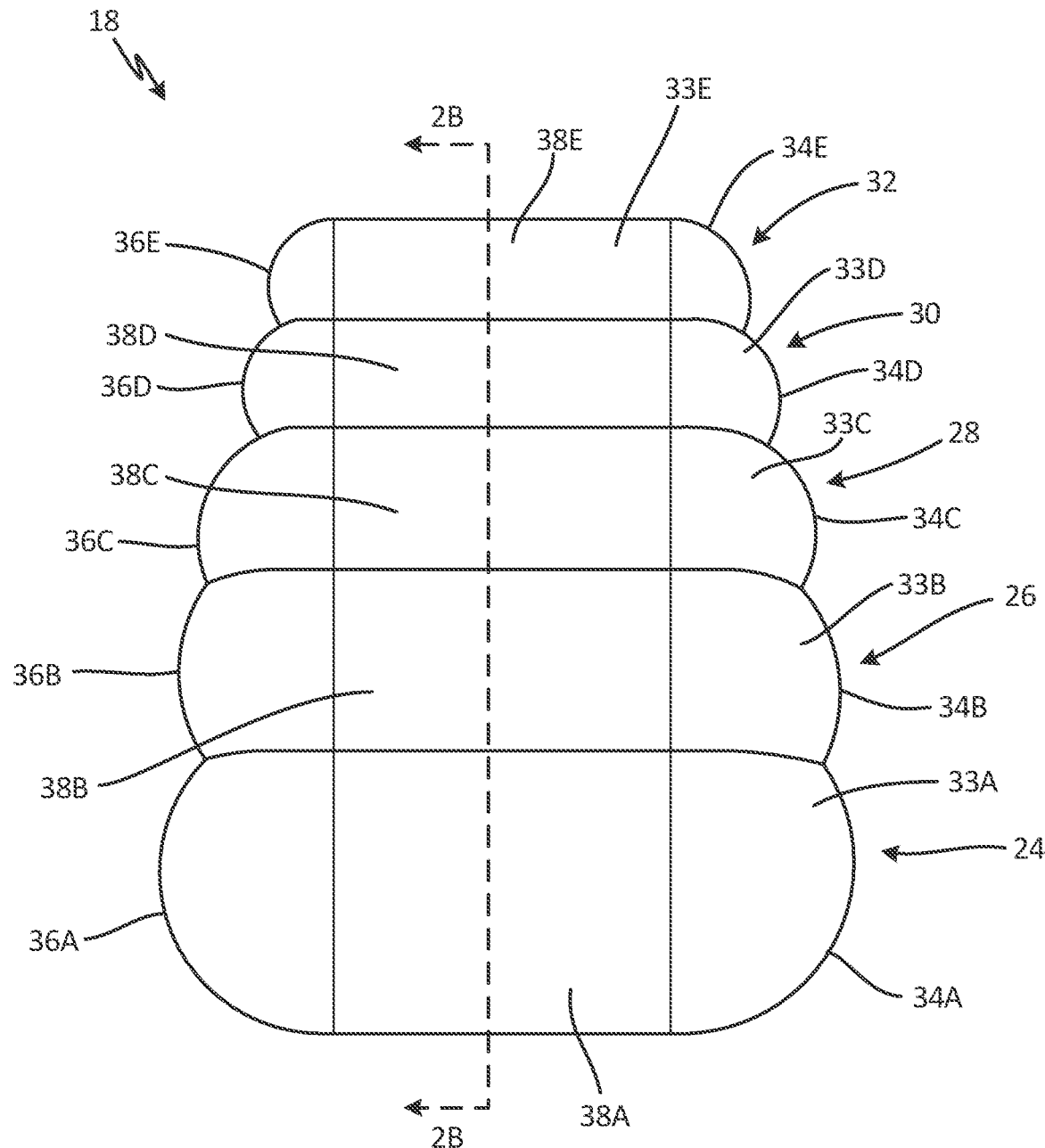
FIG. 2A illustrates a front view of a high-pressure fluid vessel, in accordance with various embodiments.
Figure 2B:
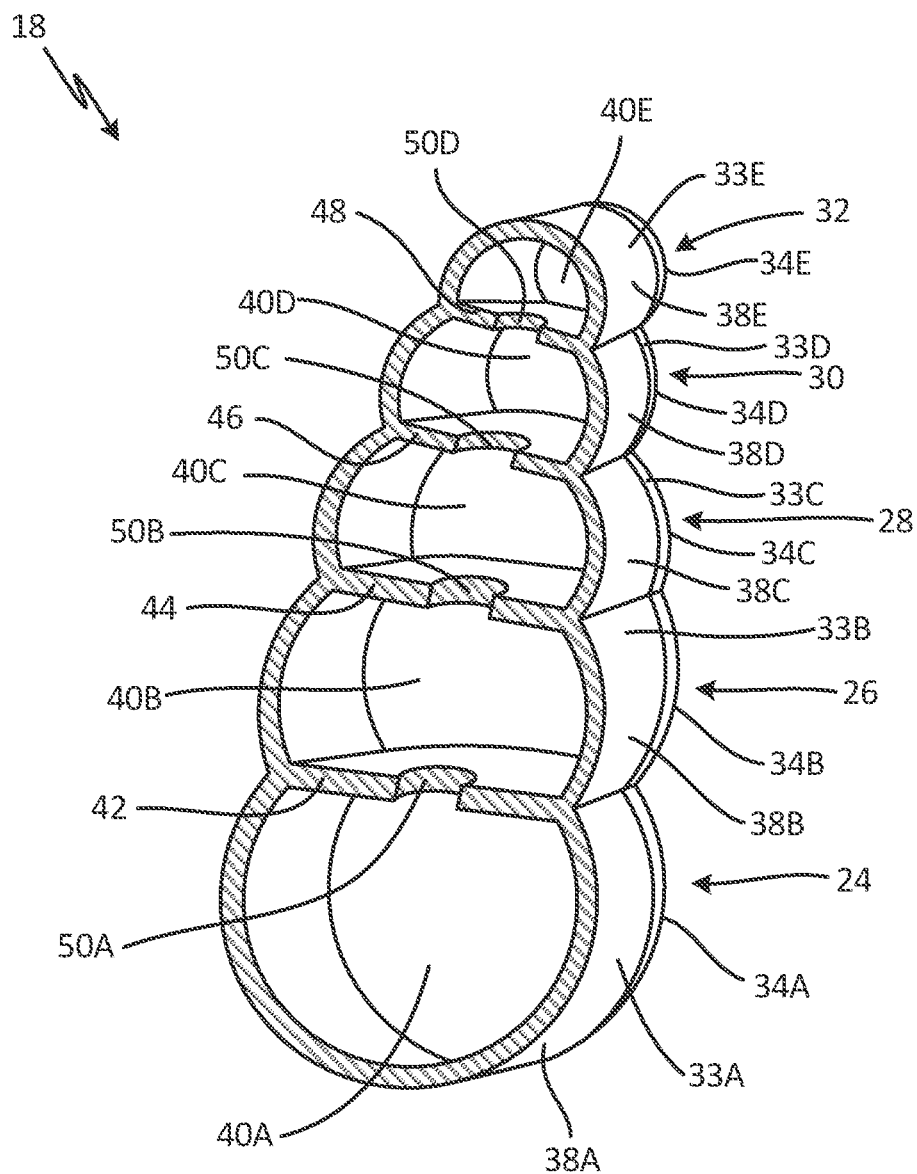
FIG. 2B illustrates a perspective cross-sectional view of the high-pressure fluid vessel taken along line 2B-2B of FIG. 2A, in accordance with various embodiments.

FIG. 2A is a front view of high-pressure fluid vessel 18, in accordance with various embodiments. FIG. 2B is a perspective cross-sectional view of high-pressure fluid vessel 18 taken along line 2B-2B of FIG. 2A, in accordance with various embodiments. With reference to both FIGS. 2A and 2B, high-pressure fluid vessel 18 includes proximal compartment 24, intermediate compartments 26, 28, and 30, and distal compartment 32. Proximal compartment 24 includes capsule 33A with first domed end 34A, second domed end 36A (shown in FIG. 2A), semi-cylindrical portion 38A, and cavity 40A (shown in FIG. 2B). Intermediate compartment 26 includes capsule 33B with first domed end 34B, second domed end 36B (shown in FIG. 2A), semi-cylindrical portion 38B, and cavity 40B (shown in FIG. 2B). Intermediate compartment 28 includes capsule 33C with first domed end 34C, second domed end 36C (shown in FIG. 2A), semi-cylindrical portion 38C, and cavity 40C (shown in FIG. 2B). Intermediate compartment 30 includes capsule 33D with first domed end 34D, second domed end 36D (shown in FIG. 2A), semi-cylindrical portion 38D, and cavity 40D (shown in FIG. 2B). Distal compartment 32 includes capsule 33E with first domed end 34E, second domed end 36E (shown in FIG. 2B), semi-cylindrical portion 38E, and cavity 40E (shown in FIG. 2B). High-pressure fluid vessel 18 further includes internal supports 42, 44, 46, and 48 (shown in FIG. 2B). Internal support 42 includes apertures 50A (shown in FIG. 2B). Internal support 44 includes aperture 50B (shown in FIG. 2B). Internal support 46 includes aperture 50C (shown in FIG. 2B). Internal support 48 includes aperture 50D (shown in FIG. 2B). "Domed," as described herein refers to rounded (e.g., hemispherical, hemi-paraboloid, hemi-ellipsoid, or the like). "End," as a described herein refers to a proximal end or a distal end of a compartment.

Located at a proximal end of high-pressure fluid vessel 18 is proximal compartment 24, which is located below and connected to intermediate compartment 26. Intermediate compartment 26 is located below and connected to intermediate compartment 28. Intermediate compartment 28 is located below and connected to intermediate compartment 30. Intermediate compartment 30 is located below and connected to distal compartment 32 at a distal end of high-pressure fluid vessel 18. In various embodiments, high-pressure fluid vessel 18 has three intermediate compartments 26, 28, and 30. In various embodiments, high-pressure fluid vessel 18 can include any number of intermediate compartments or no intermediate compartments.

Capsules 33A, 33B, 33C, 33D, and 33E are convex, curved shaped body portions of proximal compartment 24, intermediate compartments 26, 28, and 30, and distal compartment 32, respectively. Capsule 33A of proximal compartment 24 includes first domed end 34A, second domed end 36A, and semi-cylindrical portion 38A extending between and connecting first domed end 34A and second domed end 36A. Cavity 40A is positioned in proximal compartment 24 and is defined by capsule 33A. Capsule 33B of intermediate compartment 26 comprises first domed end 34B, second domed end 36B, and semi-cylindrical portion 38B extending between and connecting first domed end 34B and second domed end 36B. Cavity 40B is positioned in intermediate compartment 26 and is defined by capsule 33B. Capsule 33C of intermediate compartment 28 includes first domed end 34C, second domed end 36C, and semi-cylindrical portion 38C extending between and connecting first domed end 34C and second domed end 36C. Cavity 40C is positioned in intermediate compartment 28 and is defined by capsule 33C. Capsule 33D of intermediate compartment 30 includes first domed end 34D, second domed end 36D, and semi-cylindrical portion 38D extending between and connecting first domed end 34D and second domed end 36D. Cavity 40D is positioned in intermediate compartment 30 and is defined by capsule 33D. Capsule 33E of distal compartment 32 includes first domed end 34E, second domed end 36E, and semi-cylindrical portion 38E extending between and connecting first domed end 34E and second domed end 36E. Cavity 40E is positioned in distal compartment 32 and is defined by capsule 33E.

First domed ends 34A, 34B, 34C, 34D, and 34E and second domed ends 36A, 36B, 36C, 36D, and 36E are semispherical shaped. Semi-cylindrical portions 38A, 38B, 38C, 38D, and 38E are right circular cylindrical shaped where a cross-section of the semi-cylindrical portions 38A, 38B, 38C, 38D, and 38E are circular shaped.

Internal supports 42, 44, 46, and 48 are positioned in high-pressure fluid vessel 18 to provide structural support for high-pressure fluid vessel 18. Internal supports 42, 44, 46, and 48 are baffles in the embodiment shown in FIGS. 2A-2B. Internal support 42 is positioned between proximal compartment 24 and intermediate compartment 26. Internal support 44 is positioned between intermediate compartment 26 and intermediate compartment 28. Internal support 46 is positioned between intermediate compartment 28 and intermediate compartment 30. Internal support 48 is positioned between intermediate compartment 30 and distal compartment 32.

Aperture 50A extends through internal support 42 to connect proximal compartment 24 to intermediate compartment 26. Aperture 50B extends through internal support 44 to connect intermediate compartment 26 to intermediate compartment 28. Aperture 50C extends through internal support 46 to connect intermediate compartment 28 to intermediate compartment 30. Aperture 50D extends through internal support 48 to connect intermediate compartment 30 to distal compartment 32. In various embodiments, internal supports 42, 44, 46, and 48 can include one or more apertures 50A, 50B, 50C, and 50D, each aperture being of equal or varying size.

High-pressure fluid vessel 18 is capable of holding potable water on aircraft 10. High-pressure fluid vessel 18 includes proximal compartment 24, intermediate compartments 26, 28, and 30, and distal compartment 32 that are designed to conform to aircraft 10. High-pressure fluid vessel 18 includes internal supports 42, 44, 46, and 48 to provide structural support to high-pressure fluid vessel 18 to prevent high-pressure fluid vessel 18 from deforming under pressure. Apertures 50A, 50B, 50C, and 50D extend through internal supports 42, 44, 46, and 48 respectively, to allow potable water to flow through high-pressure fluid vessel 18.

Figure 3:
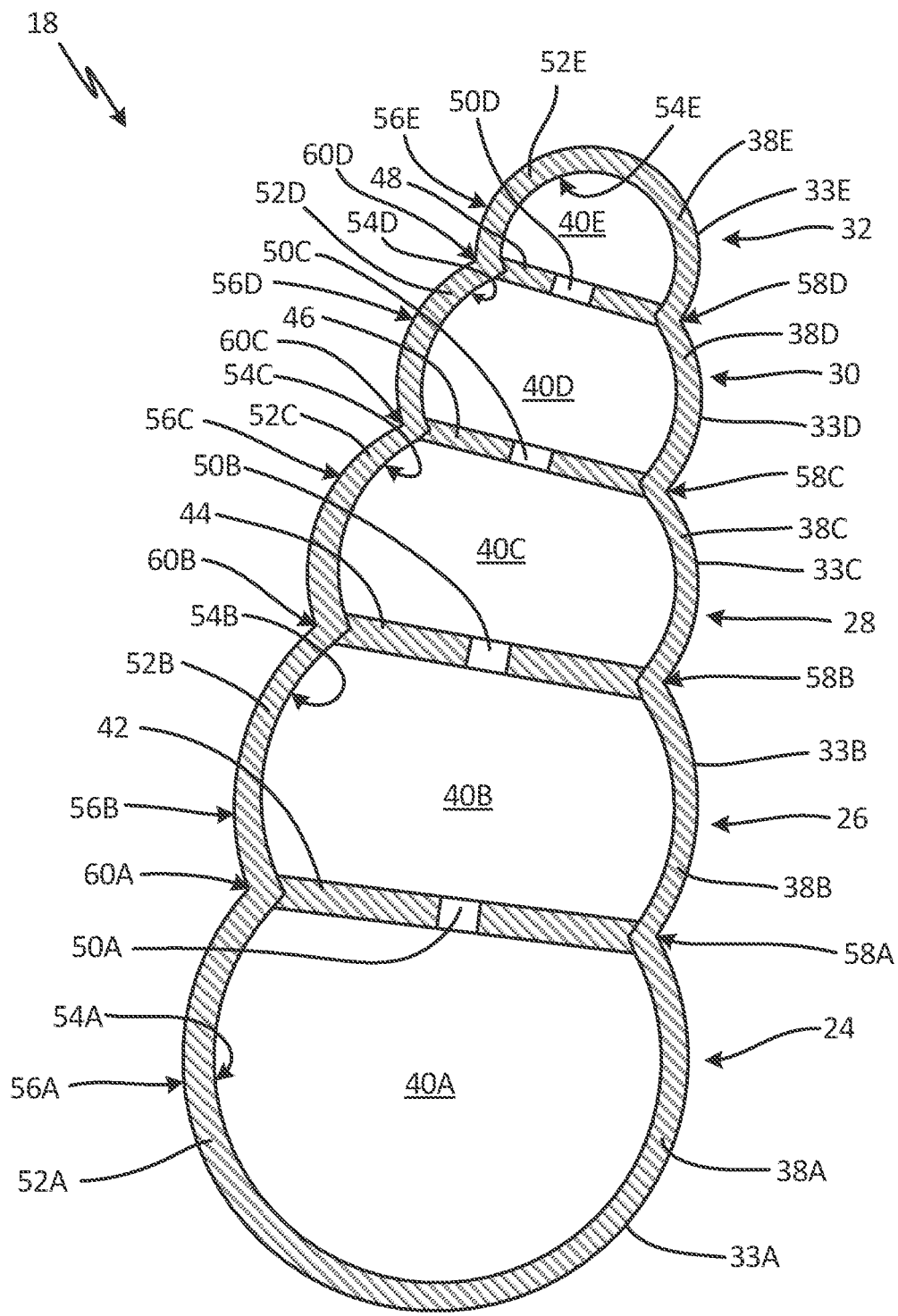
FIG. 3 illustrates a side cross-sectional view of the high-pressure fluid vessel of FIG. 2A, in accordance with various embodiments.

FIG. 3 is a side cross-sectional view of high-pressure fluid vessel 18. High-pressure fluid vessel 18 includes proximal compartment 24, intermediate compartments 26, 28, and 30, and distal compartment 32 with capsules 33A, 33B, 33C, 33D, and 33E having first domed ends 34A, 34B, 34C, 34D, and 34E (shown in FIGS. 2A-2B), second domed ends 36A, 36B, 36C, 36D, and 36E (shown in FIG. 2A), semi-cylindrical portions 38A, 38B, 38C, 38D, and 38E, and cavities 40A, 40B, 40C, 40D, and 40E, respectively. High-pressure fluid vessel 18 further includes internal supports 42, 44, 46, and 48, with apertures 50A, 50B, 50C, and 50D, respectively. Semi-cylindrical portions 38A, 38B, 38C, 38D, and 38E include curved external walls 52A, 52B, 52C, 52D, and 52E, concave inner surfaces 54A, 54B, 54C, 54D, and 54E, and convex outer surfaces 56A, 56B, 56C, 56D, and 56E, respectively. Also shown in FIG. 3 are first intersection locations 58A, 58B, 58C, and 58D and second intersection locations 60A, 60B, 60C, and 60D.

High-pressure fluid vessel 18 includes proximal compartment 24 at a base, intermediate compartments 26, 28, and 30, and distal compartment 32 at a distal end. Capsules 33A, 33B, 33C, 33D, and 33E are arcuate shaped body portions of proximal compartment 24, intermediate compartments 26, 28, and 30, and distal compartment 32, respectively. Proximal compartment 24 includes capsule 33A with first domed end 34A opposite of second domed end 36A and semi-cylindrical portion 38A extending there between. Cavity 40A is formed in proximal compartment 24. Intermediate compartment 26 includes capsule 33B with first domed end 34B opposite of second domed end 36B and semi-cylindrical portion 38C extending there between. Cavity 40B is formed in intermediate compartment 26. Intermediate compartment 28 includes capsule 33C with first domed end 34C opposite of second domed end 36C and semi-cylindrical portion 38C extending there between. Cavity 40C is formed in intermediate compartment 28. Intermediate compartment 30 includes capsule 33D with first domed end 34D opposite of second domed end 36D and semi-cylindrical portion 38D extending there between. Cavity 40D is formed in intermediate compartment 30. Distal compartment 32 includes capsule 33E with first domed end 34E opposite of second domed end 36E and semi-cylindrical portion 38E extending there between. Cavity 40E is formed in distal compartment 32.

High-pressure fluid vessel 18 further includes internal supports 42, 44, 46, and 48. Internal support 42 is positioned between proximal compartment 24 and intermediate compartment 26, and aperture 50A extends through internal support 42. Internal support 44 is positioned between intermediate compartment 26 and intermediate compartment 28, and aperture 50B extends through internal support 44. Internal support 46 is positioned between intermediate compartment 28 and intermediate compartment 30, and aperture 50C extends through internal support 46. Internal support 48 is positioned between intermediate compartment 30 and distal compartment 32, and aperture 50D extends through internal support 48.

High-pressure fluid vessel 18 will include a port to fill high-pressure fluid vessel 18. The port is preferably positioned in distal compartment 32 but can be positioned in any of proximal compartment 24, intermediate compartments 26, 28, 30, and distal compartment 32. A liquid such as water may be placed into and released from high-pressure fluid vessel 18 through the port. The liquid in high-pressure fluid vessel 18 may move between proximal compartment 24, intermediate compartments 26, 28, 30, and distal compartment 32 by flowing through apertures 50A, 50B, 50C, and 50D. Apertures 50A, 50B, 50C, and 50D can be any size and shape and there can be multiple apertures 50A, 50B, 50C, and 50D in internal supports 42, 44, 46, and 48 in various embodiments. High-pressure fluid vessel 18 will also include a port to remove water from the vessel. The port is positioned at a proximal end of proximal compartment 24.

High-pressure fluid vessel 18 is designed to conform to a space on aircraft 10 (see FIG. 1B). Semi-cylindrical portions 38A, 38B, 38C, 38D, and 38E of proximal compartment 24, intermediate compartments 26, 28, and 30, and distal compartment 32, respectively, are curved to help high-pressure fluid vessel 18 conform to the space on aircraft 10 and to reduce stresses in semi-cylindrical portions 38A, 38B, 38C, 38D, and 38E.

Semi-cylindrical portion 38A of proximal compartment 24 includes curved external wall 52A. Curved external wall 52A includes concave inner surface 54A and convex outer surface 56A. Semi-cylindrical portion 38B of intermediate compartment 26 includes curved external wall 52B. Curved external wall 52B further includes concave inner surface 54B and convex outer surface 56B. Semi-cylindrical portion 38C of intermediate compartment 28 includes curved external wall 52C. Curved external wall 52C includes concave inner surface 54C and convex outer surface 56C. Semi-cylindrical portion 38D of intermediate compartment 30 includes curved external wall 52D. Curved external wall 52D further includes concave inner surface 54D and convex outer surface 56D. Semi-cylindrical portion 38E of distal compartment 32 includes curved external wall 52E. Curved external wall 52E includes concave inner surface 54E and convex outer surface 56E.

High-pressure fluid vessel 18 includes a flat side portion and a curved side portion. The flat side portion is the side in which a tangent line can be drawn from curved external wall 52A to curved external wall 52E and approximately only contact curved external walls 52B, 52C, and 52D at a single tangent point of each; the right side of high-pressure fluid vessel 18 as oriented in FIG. 3. The curved side portion is the side opposite the flat side portion; the left side of high-pressure fluid vessel 18 as oriented in FIG. 3.

Curved external walls 52A, 52B, 52C, 52D, and 52E abut one another at first intersection locations 58A, 58B, 58C, and 58D and second intersection locations 60A, 60B, 60C, and 60D, respectfully. Proximal compartment 24 is connected to intermediate compartment 26 at first intersection location 58A and second intersection location 60A. Intermediate compartment 26 is connected to intermediate compartment 28 at first intersection location 58B and second intersection location 60B. Intermediate compartment 28 is connected to intermediate compartment 30 at first intersection location 58C and second intersection location 60C. Intermediate compartment 30 is connected to distal compartment 32 at first intersection location 58D and second intersection location 60D.

Located on the flat side portion of high-pressure fluid vessel 18 are first intersection locations 58A, 58B, 58C, and 58D. The intersection of curved external wall 52A and curved external wall 52B defines first intersection location 58A. The intersection of curved external wall 52B and curved external wall 52C defines first intersection location 58B. The intersection of curved external wall 52C and curved external wall 52D defines first intersection location 58C. The intersection of curved external wall 52D and curved external wall 52E defines first intersection location 58D.

Located on the curved side portion of high-pressure fluid vessel 18 are second intersection locations 60A, 60B, 60C, and 60D. The intersection of curved external wall 52A and curved external wall 52B defines second intersection location 60A. The intersection of curved external wall 52B and curved external wall 52C defines second intersection location 60B. The intersection of curved external wall 52C and curved external wall 52D defines second intersection location 60C. The intersection of curved external wall 52D and curved external wall 52E defines second intersection location 60D.

According to the present disclosure, high-pressure fluid vessel 18 must include at least two compartments connected at a first intersection location and a second intersection location. High-pressure fluid vessel 18, in its smallest form, includes proximal compartment 24 and distal compartment 32 connected at a first intersection location and a second intersection location. With that said, high-pressure fluid vessel 18 is not limited to a maximum number of compartments and intersection locations; high-pressure fluid vessel 18 can include as many compartments and intersection locations as desired to conform to an irregular shape or space. The high-pressure fluid vessel described in the preceding paragraphs is a representation of a single embodiment and not meant to limit the disclosure to this particular embodiment.

As shown in FIG. 1B and discussed above, high-pressure fluid vessel 18 curves to conform to external fuselage structure 20. The curvature described is achieved by proximal compartment 24, intermediate compartments 26, 28, and 30, and distal compartment 32 having different volumes and radii of curvature. Proximal compartment 24 has the largest volume and radius of curvature, intermediate compartment 26 has a volume and radius of curvature that is smaller than proximal compartment 24, intermediate compartment 28 has a volume and radius of curvature that is smaller than intermediate compartment 26, intermediate compartment 30 has a volume and radius of curvature that is smaller than intermediate compartment 28, and distal compartment 32 has the smallest volume and radius of curvature. The radii of curvature of first domed ends 34A, 34B, 34C, 34D, and 34E, second domed ends 36A, 36B, 36C, 36D, and 36E, and semi-cylindrical portions 38A, 38B, 38C, 38D, and 38E, respectively, are preferably the same for each of capsule 33A, 33B, 33C, 33D, and 33E. The curvature of high-pressure fluid vessel 18 is achieved by curved external walls 52A, 52B, 52C, 52D, and 52E having different volumes and radii while maintaining the flat side portion of high-pressure fluid vessel 18. With the flat side portion being held constant and the compartments volume and radii being different, the curved side portion is formed. The curvature of the curved side portion can be varied by modifying the volume and radii of each compartment. In the embodiment shown, high-pressure fluid vessel 18 includes five compartments, each of different volumes and radii. In all embodiments of high-pressure fluid vessel 18, at least two of the compartments must be of different volumes and radii.

High-pressure fluid vessel 18 further includes internal supports 42, 44, 46, and 48 to prevent proximal compartment 24, intermediate compartments 26, 28, 30, and distal compartment 32 from deforming under internal pressure. Internal supports 42, 44, 46, and 48 include apertures 50A, 50B, 50C, and 50D, respectively.

Internal support 42 extends from first intersection location 58A to second intersection location 60A. Internal support 44 extends from first intersection location 58B to second intersection location 60B. Internal support 46 extends from first intersection location 58C to second intersection location 60C. Internal support 48 extends from first intersection location 58D to second intersection location 60D.

High-pressure fluid vessel 18 would deform under internal pressure without internal supports 42, 44, 46, and 48. Internal supports 42, 44, 46, and 48 provide structural support to curved external walls 52A, 52B, 52C, 52D, and 52E. Further, internal supports 42, 44, 46, and 48, are strategically placed to evenly distribute the stresses in curved external walls 52A, 52B, 52C, 52D, and 52E. This results in a high-pressure fluid vessel that is high strength and structurally efficient.

In various embodiments, the high-pressure fluid vessel may comprise an epoxy carbon composite material, or any other material known in the art. In various embodiments, an interior liner as a barrier to prevent trace potable water non-compliable materials leaking and/or prevent water from direct contacting the concave inner surfaces 54A, 54B, 54C, 54D, 54E and internal supports 42, 44, 46, and 48. In various embodiments, apertures 50A, 50B, 50C, 50D are relatively small (e.g., approximate 1 in$^2$ (6.45 cm$^2$)), which may make it difficult to coat the interior surfaces (e.g., concave inner surfaces 54A, 54B, 54C, 54D, 54E and internal supports 42, 44, 46, and 48) via thermoset polyurea, thermoset polyvinyl chloride, or the like.

Figure 4:
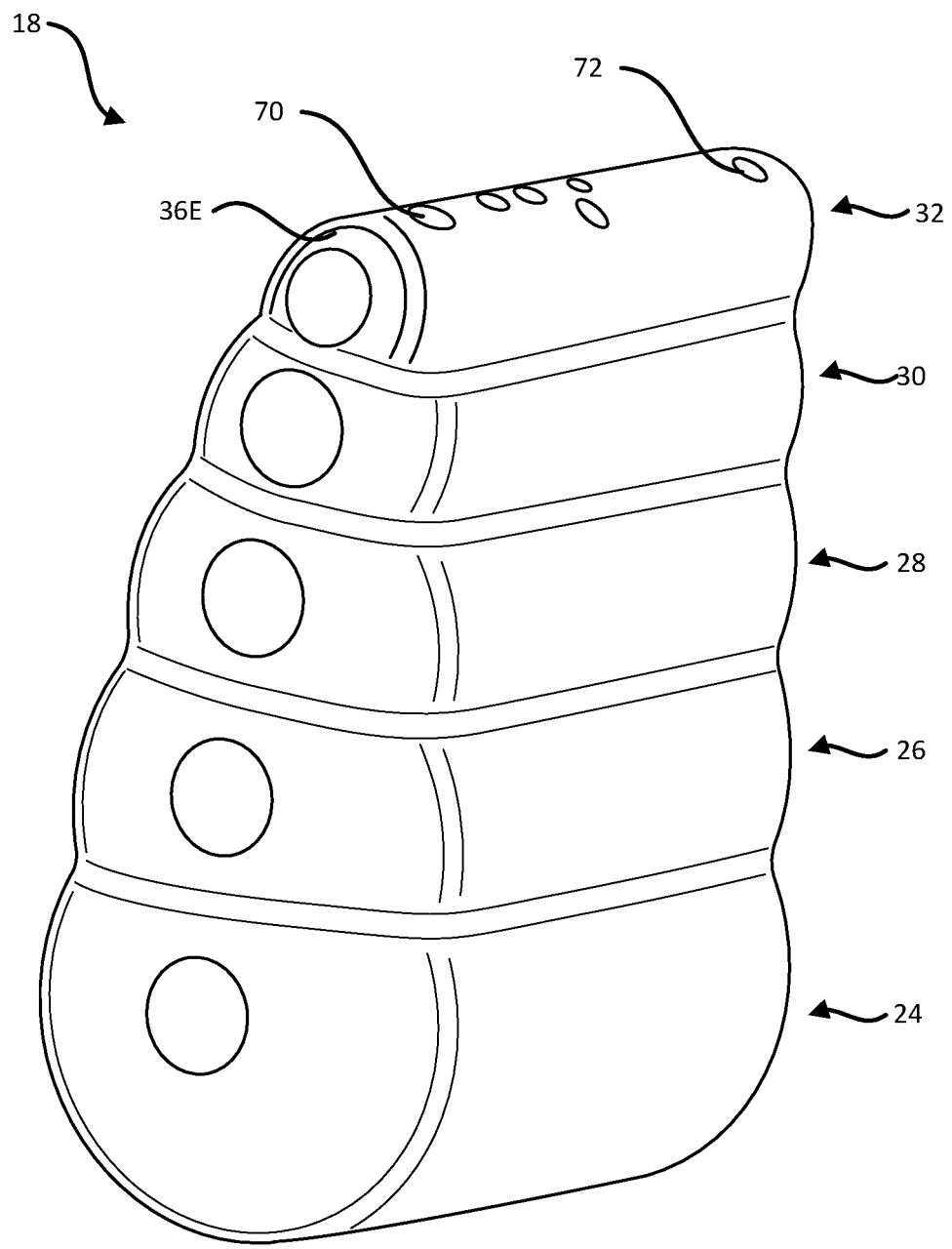
FIG. 4 illustrates a perspective view of the high-pressure fluid vessel, in accordance with various embodiments.

Referring now to FIG. 4, a perspective view of high-pressure fluid vessel 18 is illustrated, in accordance with various embodiments. In various embodiments, high-pressure fluid vessel 18 includes an inlet port 70 and an outlet port 72. In various embodiments, inlet port 70 and outlet port 72 may be disposed on second domed end 36E. Although illustrated as being disposed on second domed end 36E, the high-pressure fluid vessel 18 is not limited in this regard. For example, the inlet port 70 and the outlet port 72 may be disposed anywhere on the high-pressure fluid vessel 18 and be within the scope of this disclosure.

Figure 5:
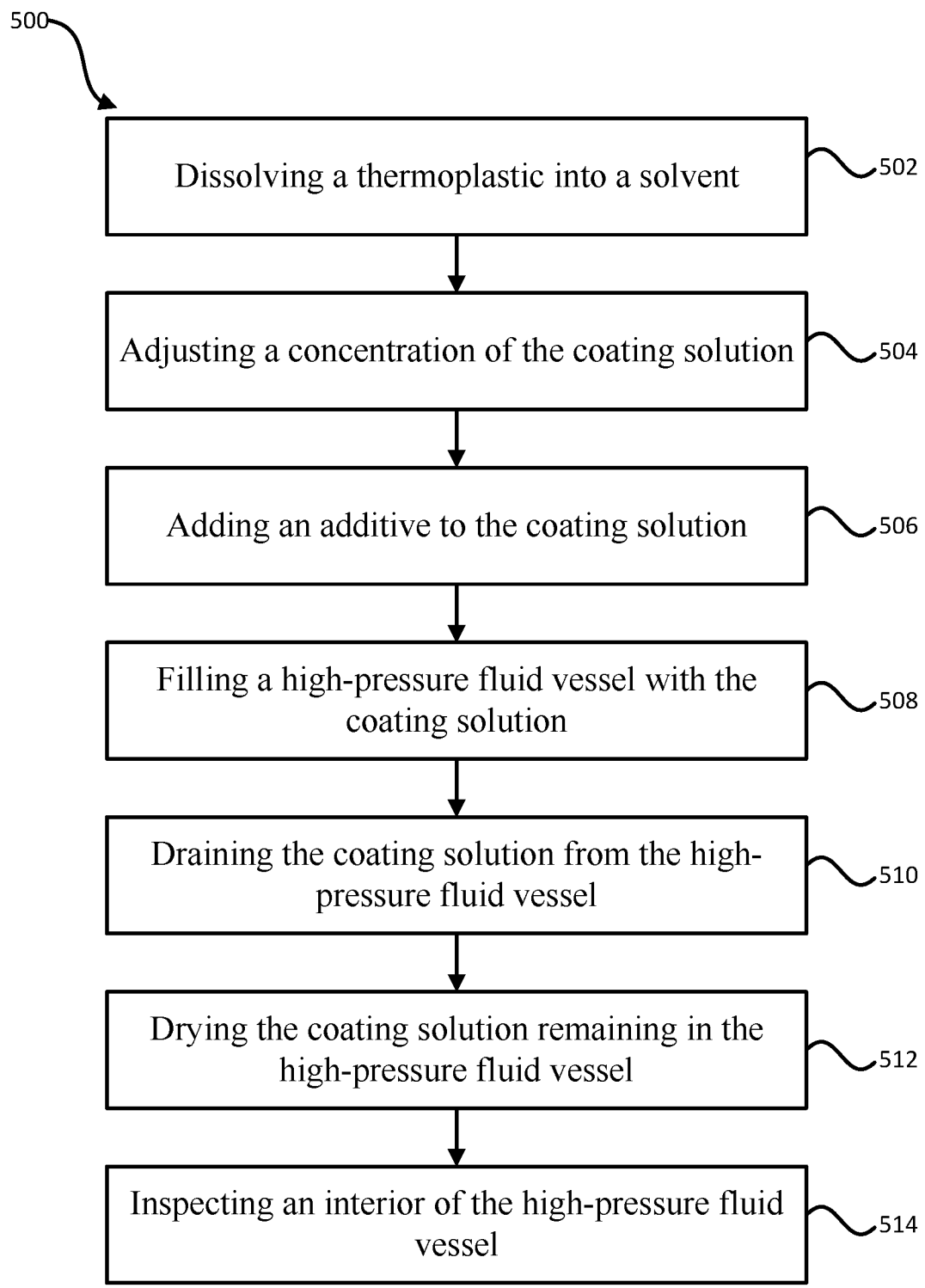
FIG. 5 illustrates a method for coating a vessel, in accordance with various embodiments.

Referring now to FIG. 5, a method of a coating an interior surface of a high-pressure fluid vessel (e.g., high-pressure fluid vessel 18 from FIGS. 1A-4), in accordance with various embodiments. The method 500 may comprise dissolving a thermoplastic into a solvent to form a coating solution (step 502). In various embodiments, the thermoplastic may comprise a relatively hard thermoplastic elastomer. For example, in various embodiments, the thermoplastic may comprise a hardness between 75 shore A and 95 shore A, or between 80 shore A and 95 shore A. In various embodiments, the thermoplastic may comprise a thermoplastic elastomer with a relatively high melting temperature. For example, the thermoplastic elastomer may comprise a melting temperature between 120° C. (248° F.) and 220° C. (428° F.), or between 140° C. (284° F.) and 220° C. (428° F.), or between 160° C. (310° F.) and 210° C. (608° F.). In various embodiments, the thermoplastic elastomer may comprise a relatively low glass transition temperature. For example, the thermoplastic elastomer may comprise a glass transition temperature between −20° C. (−4° F.) and −100° C. (−148° F.), or between −25° C. (−13° F.) and −95° C. (−139° F.). In various embodiments, the thermoplastic may comprise a thermoplastic elastomer, such as a thermoplastic polyurethane, for example a polyether-type thermoplastic polyurethane, such as that sold under the trademark Estane®, which is available from Lubrizol Corporation located in Wickliffe, Ohio (e.g., Estane® 58887, or the like), or other thermoplastic elastomers with properties in the ranges above.

In various embodiments, the solvent may be any solvent configurable to dissolve a thermoplastic elastomer. For example, the solvent may comprise a moderate polar aprotic solvent such as tetrahydrofuran (THF), ethyl acetate, cyclohexanone, or any other solvent or solvent combination known in the art. In various embodiments, the method 500 may further comprise adjusting a concentration of the coating solution to achieve a desired coating thickness (step 504). For example, additional thermoplastic elastomer may be added to the coating solution to increase a coating thickness or additional solvent may be added to reduce a coating thickness.

In various embodiments, the method 500 may further comprise adding an additive to the coating solution (step 506). In various embodiments, the additive may be for pigment alteration for visibility during inspection and/or for dripping prevention during drying. For example, a pigment additive, such as a white pigment additive may be utilized for visibility inspection to ensure uniform coating. An example pigment additive may comprise titanium oxide, or the like. Although described herein as including titanium oxide for a pigment additive, any food grade pigment or dye additive may be utilized in accordance with this disclosure. In various embodiments, the additive may include a rheology modifier for better coating dripping or sagging prevention during drying. For example, the additive may comprise a silica or silicon oxide additive. Clay, urea, and polysaccharide based rheology modifiers may be also used. In various embodiments, both a rheology modifier and a pigment additive may be utilized in combination.

In various embodiments, the method 500 may further comprise filling a high-pressure fluid vessel (e.g., high-pressure fluid vessel 18 from FIGS. 1A-4) with the coating solution (step 508). In various embodiments, the high-pressure fluid vessel may be filled completely with the coating solution via an inlet port (e.g., inlet port 70 from FIG. 4). In various embodiments, filling the high-pressure fluid vessel may result in each compartment being entirely filled (e.g., cavities 40A, 40B, 40C, 40D, 40E from FIG. 2B). The high pressure fluid vessel may be tilted, tumbled, and/or shaken to ensure all interior surfaces are coated.

In various embodiments, the method 500 further comprises draining the coating solution form the high-pressure fluid vessel (step 510). In various embodiments, the draining may be performed by suction, by gravity, or the like. In various embodiments, the coating solution may be drained into a container for re-use on another high-pressure fluid vessel. In this regard, the same coating solution may be utilized for a plurality of high-pressure fluid vessels resulting in reduced manufacturing time and/or reduced cost of manufacturing.

In various embodiments, in response to draining the coating solution, a film of the coating solution may remain in the high-pressure fluid vessel on the interior surfaces (e.g., concave inner surfaces 54A, 54B, 54C, 54D, 54E and internal supports 42, 44, 46, and 48 from FIG. 3).

In various embodiments, the method 500 may further comprise drying the film of the coating solution in the high-pressure fluid vessel (step 512). In various embodiments, the drying may be performed by flowing air through the fluid vessel. For example, air may be flowed into an inlet port (e.g., inlet port 70 from FIG. 4) into the compartments (e.g., cavities 40A, 40B, 40C, 40D, 40E from FIG. 2B) and out through an outlet port (e.g., outlet port 72 from FIG. 4). In various embodiments, in response to flowing the air through the high-pressure fluid vessel, the air may dry boils off and/or remove the solvent from the coating solution. Other gases such as dry nitrogen may be used. In this regard, the thermoplastic elastomer and any additives may remain to form food grade thermal liner within the high-pressure fluid vessel.

In various embodiments, the drying may comprise heating the compartments (e.g., cavities 40A, 40B, 40C, 40D, 40E from FIG. 2B) by any method known in the art. For example, the high-pressure fluid vessel may be disposed in an oven. The oven may then be heated. In response to heating the film of the coating solution, boils may dry off and/or the solvent from the film may be removed. The high pressure fluid vessel may also be placed in a vacuum chamber. The air may then be drawn out of the vacuum chamber. In response to the lower pressure in the vacuum chamber, the solvent may boil off or dry. In this regard, the thermoplastic elastomer and any additives may remain to form food grade thermal liner within the high-pressure fluid vessel. The air flow, heating, and vacuum may be used in combination and/or sequence to improve the time needed to remove the solvent from the liner.

In various embodiments, the resultant coating from the method 500 may comprise a food grade coating. "Food grade" as defined herein refers to a material that does not leach hazardous chemicals. In this regard, potable water stored in the high-pressure fluid vessel may remain safe for consumption for occupants of an aircraft.

In various embodiments, the method 500 may further comprise inspecting an interior of the high-pressure fluid vessel to ensure the interior is entirely covered with the food grade coating (step 514). In various embodiments, inspecting the interior may further comprise inserting a borescope having a light coupled thereon into the compartments (e.g., cavities 40A, 40B, 40C, 40D, 40E from FIG. 2B) of the high-pressure fluid vessel. The light may be configured to shine onto the interior of the high-pressure fluid vessel and an inspector may view where the light is shining via the borescope. In various embodiments, the pigment additive may be configured to turn the food grade coating a desired pigment (e.g., white, yellow, pink, neon, fluorescent, or the like). In various embodiments, the desired pigment may contrast with the interior of the high-pressure fluid vessel. For example, in accordance with various embodiments, the interior of the high-pressure fluid vessel may be black, or the like. In this regard, in response to inspecting the interior of the high-pressure fluid vessel, an inspector may determine whether additional coating is necessary. If additional coating is necessary, the method 500 may be repeated or an additional coating may be added via a thermoset, or the like.

In various embodiments, steps 508, 510, 512, and 514 may be repeated on a second high-pressure fluid vessel after step 510. For example, after draining the coating solution (step 510) from a first high-pressure fluid vessel, a second high-pressure fluid vessel may be filled with the coating solution (step 508) and steps 510, 512, and 514 may be repeated for the second high-pressure fluid vessel.

Figure 6:
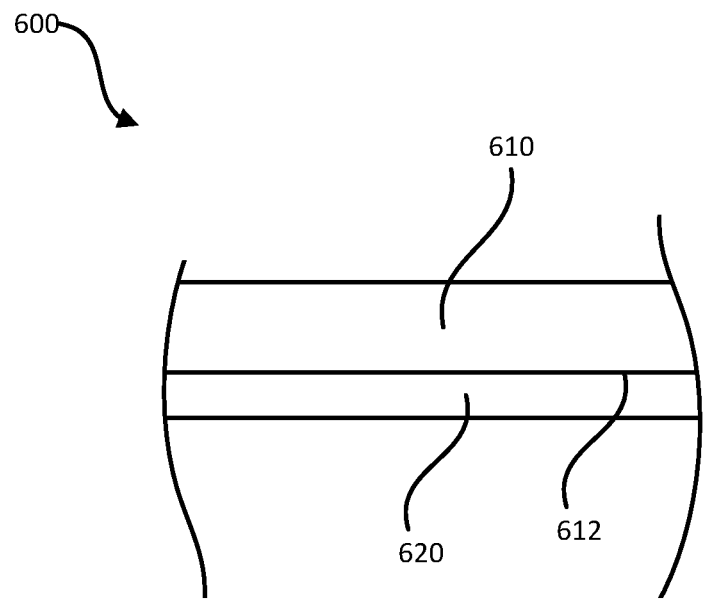
FIG. 6 illustrates a portion of a vessel in accordance with various embodiments.

Referring now to FIG. 6, a cross-section view of a portion 600 of a high-pressure fluid vessel is illustrated, in accordance with various embodiments. In various embodiments, the portion 600 comprises a wall 610 and a coating 620 disposed on an interior surface 612 of the wall. In various embodiments, the concave inner surfaces 54A, 54B, 54C, 54D, 54E from FIG. 3 may be in accordance with interior surface 612.

Figure 7:
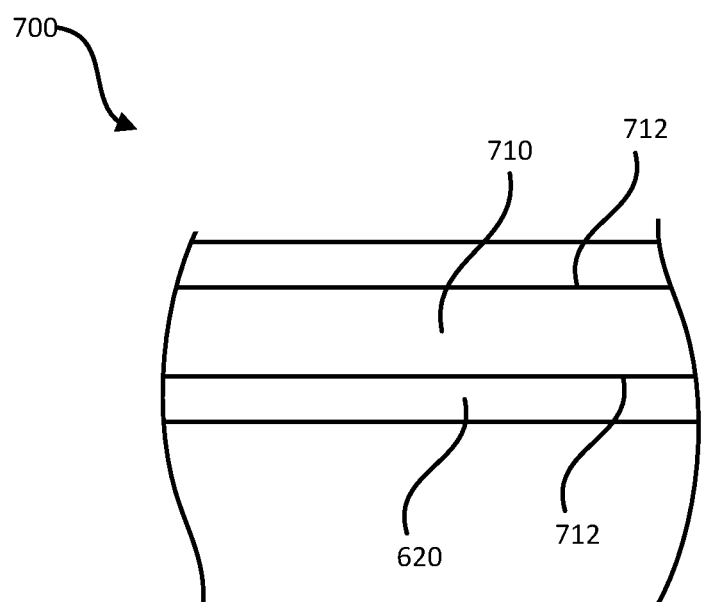
FIG. 7 a portion of a vessel in accordance with various embodiments.

Referring now to FIG. 7, a cross-section view of a portion 700 of a high-pressure fluid vessel is illustrated, in accordance with various embodiments. In various embodiments, the portion 700 comprises a wall 710 and a coating 620 disposed on an interior surface 712 of the wall. In various embodiments, the internal supports 42, 44, 46, and 48 from FIG. 3 may be in accordance with interior surface 712. As such, "interior surface" as described herein, is a surface disposed internal of the high-pressure fluid-vessel (e.g., high-pressure fluid vessel 18) and any surface defined by cavities 40A, 40B, 40C, 40D, 40E from FIG. 2B.

In various embodiments, the coating 620 may be in accordance with the food grade coating formed by method 500. For example, the coating 620 may comprise a thermoplastic elastomer, a pigment modifier, and/or a rheology modifier. In various embodiments, the pigment modifier may additionally be configured to provide more robust properties for the coating 620. For example, when a titanium dioxide additive is utilized, the coating may exhibit greater adhesion than typical coatings.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of coating a plurality of fluid vessels, the method comprising:
dissolving a thermoplastic elastomer into at least one solvent to form a coating solution, the thermoplastic elastomer having a hardness between 75 shore A and 95 shore A, a melting temperature between 120° C. (248° F.) and 220° C. (428° F.), and a glass transition temperature between 120° C. (248° F.) and 220° C. (428° F.);
adding an additive including a pigment additive to the coating solution, wherein the pigment additive alters a color of the coating solution to a first color, the first color contrasting with a second color of an interior surface of a first fluid vessel;
filling the first fluid vessel with the coating solution;
draining the coating solution from the first fluid vessel;
drying the first fluid vessel to form a food grade coating;
inspecting, via a borescope with a light, a coverage of the food grade coating of the interior surface of the first fluid vessel by contrasting the first color with the second color;

filling a second fluid vessel with the coating solution;
draining the coating solution from the second fluid vessel; and
drying the second fluid vessel.

2. The method of claim 1, wherein the food grade coating is a film of the coating solution that remains on the interior surface of the first fluid vessel in response to draining the coating solution.

3. The method of claim 1, wherein drying the first fluid vessel h includes flowing air through an inlet port of the first fluid vessel and out an outlet port of the first fluid vessel.

4. The method of claim 1, further comprising adjusting a concentration of the coating solution to achieve a desired coating thickness.

5. A method of coating a fluid vessel, the method comprising:
dissolving a thermoplastic elastomer into a solvent to form a coating solution, wherein the thermoplastic elastomer includes a hardness between 75 shore A and 95 shore A, a melting temperature between 120° C. (248° F.) and 220° C. (428° F.), and a glass transition temperature between 120° C. (248° F.) and 220° C. (428° F.);
adding a pigment additive to the coating solution, wherein the pigment additive alters a color of the coating solution to a first color;
filling the fluid vessel with the coating solution;
draining the coating solution from the fluid vessel;
drying the coating solution remaining in the fluid vessel to form a food grade coating on an interior surface of the fluid vessel; and
inspecting, via a borescope with a light, a coverage of the food grade coating of the interior surface by contrasting the first color to a second color of the fluid vessel.

6. The method of claim 5, further comprising adjusting a concentration of at least one of the thermoplastic elastomer and the solvent to the coating solution to reach a desired thickness of the food grade coating.

7. The method of claim 5, wherein the pigment additive includes titanium oxide.

8. The method of claim 5, further comprising adding a rheology modifier to the coating solution to prevent dripping of the food grade coating during drying.

9. The method of claim 5, wherein the fluid vessel is configured for a potable water system.

10. A method of manufacturing a fluid vessel, the method comprising:
dissolving a thermoplastic elastomer into a solvent to form a coating solution, wherein the thermoplastic elastomer includes a hardness between 75 shore A and 95 shore A, a melting temperature between 120° C. (248° F.) and 220° C. (428° F.), and a glass transition temperature between 120° C. (248° F.) and 220° C. (428° F.);
adding a pigment additive to the coating solution, wherein the pigment additive alters a color of the coating solution to a first color;
coating an interior surface of the fluid vessel to form a food grade coating; and
inspecting, via a borescope with a light, a coverage of the food grade coating of the interior surface by contrasting the first color to a second color of the fluid vessel.

11. The method of claim 10, wherein the pigment additive comprises titanium oxide.

12. The method of claim 10, wherein coating the interior surface of the fluid vessel includes filling the fluid vessel with the coating solution.

13. The method of claim 12, wherein coating the interior surface of the fluid vessel further comprises draining the coating solution from the fluid vessel.

14. The method of claim 13, wherein coating the interior surface of the fluid vessel further comprises drying the coating solution remaining in the fluid vessel to form the food grade coating on the interior surface of the fluid vessel.

\* \* \* \* \*